US009268793B2

(12) United States Patent
Hu et al.

(10) Patent No.: US 9,268,793 B2
(45) Date of Patent: Feb. 23, 2016

(54) ADJUSTMENT OF FACIAL IMAGE SEARCH RESULTS

(71) Applicant: Google Inc., Mountain View, CA (US)

(72) Inventors: Wenze Hu, Los Angeles, CA (US); Zhongli Ding, Mountain View, CA (US); Hartwig Adam, Marina Del Rey, CA (US); Randall G. Keller, Palo Alto, CA (US)

(73) Assignee: Google Inc., Mountain View, CA (US)

(*) Notice: Subject to any disclaimer, the term of this patent is extended or adjusted under 35 U.S.C. 154(b) by 188 days.

(21) Appl. No.: 14/205,669

(22) Filed: Mar. 12, 2014

(65) Prior Publication Data
US 2015/0261787 A1 Sep. 17, 2015

(51) Int. Cl.
G06K 9/00 (2006.01)
G06F 17/30 (2006.01)
G06K 9/62 (2006.01)

(52) U.S. Cl.
CPC ...... *G06F 17/30247* (2013.01); *G06K 9/00288* (2013.01); *G06K 9/6218* (2013.01); *G06K 9/6284* (2013.01)

(58) Field of Classification Search
CPC .............. G06F 17/30247; G06K 9/00288; G06K 9/6284; G06K 9/6218
USPC ................... 382/118, 217, 225, 278
See application file for complete search history.

(56) References Cited

U.S. PATENT DOCUMENTS

| 7,031,499 | B2 * | 4/2006 | Viola | G06K 9/00268 382/118 |
| 8,200,010 | B1 | 6/2012 | Jing | |
| 8,249,361 | B1 | 8/2012 | Steffens | |
| 8,325,999 | B2 | 12/2012 | Kapoor | |
| 8,605,956 | B2 | 12/2013 | Ross | |
| 2003/0059107 | A1 * | 3/2003 | Sun | G06F 17/3025 382/165 |
| 2003/0210805 | A1 * | 11/2003 | Lofgren | G03H 1/08 382/100 |
| 2007/0239683 | A1 * | 10/2007 | Gallagher | G06F 17/30265 |
| 2008/0052312 | A1 | 2/2008 | Tang | |
| 2008/0304755 | A1 * | 12/2008 | Xiao | G06F 17/30017 382/225 |
| 2009/0252383 | A1 * | 10/2009 | Adam | G06K 9/00288 382/118 |
| 2013/0084002 | A1 | 4/2013 | Bhardwaj | |

OTHER PUBLICATIONS

Ai et al., "Face Detection Based on Template Matching and Support Vector Machines," Dept. of Computer Science and Technology, Tsinghua University, Beijing 100084, PR China, 2001 IEEE, 4 pages.

(Continued)

*Primary Examiner* — Samir Ahmed
(74) *Attorney, Agent, or Firm* — Fish & Richardson P.C.

(57) ABSTRACT

Methods, systems, and apparatus, including computer programs encoded on a computer storage medium, for adjusting facial image search results. In one aspect, a method includes detecting, in images that are responsive to a query, faces in the images and building facial templates. The images are then clustered according to similarity measures of the facial templates. The cluster with the highest quantity is selected, and each image in the set of returned images is compared to each image in the selected cluster. The similarity of each face with the faces in the largest cluster, based on the facial templates, is determined as an inlier score for the image in which the face is depicted. The system then increases the rank of images with high inlier scores and decreases the rank of images with low inlier scores.

20 Claims, 4 Drawing Sheets

(56) References Cited

OTHER PUBLICATIONS

U.S. Appl. No. 13/401,076, filed Feb. 21, 2012, Facial Recognition, Matthew S. Steiner.
U.S. Appl. No. 61/683,617, filed Aug. 15, 2012, Facial Recognition Similarity Threshold Adjustment, Michael Christian Nechyba.
U.S. Appl. No. 13/736,760, filed Jan. 8, 2013, Facial Feature Detection, Michael Christian Nechyba.

* cited by examiner

ADJUSTMENT OF FACIAL IMAGE SEARCH RESULTS

BACKGROUND

This specification relates to scoring images that are related to particular entities.

The Internet provides access to a wide variety of resources, for example, webpages, images, audio files, and videos. A variety of search engines are available for identifying particular resources accessible over the Internet. For example, digital images that satisfy a user's informational need can be identified by an image search process in which keywords or other data are processed to identify collections of digital images. Each image is identified to the user by an image search result. The image search result may include a thumbnail of an image to which it links.

Search results generated by a search engine are generally ranked and presented to a user in an ordered list of search results. The rankings may be based on how the search engine determines the relevance of resources specified by the search results to a particular query issued by the user.

A very common entity that people search for is a person. Thus, users use search engines to identify images associated with a particular person. The images associated with the particular person typically are images that depict the face of the particular person.

SUMMARY

In general, one innovative aspect of the subject matter described in this specification can be embodied in methods that include the actions of receiving data identifying images determined to be responsive to a query, each image having an associated search score that is a measure of responsiveness to the query, and the images ranked according to a first order based on the search scores, and in response to receiving the data identifying the images: for each image in a first set of the images, detecting a face depicted in the image and generating a face template from the depicted face, clustering the images in the first set of images into a plurality of clusters based on similarity of the facial templates to each other, each cluster including at least one of the images, and each image belonging to only one cluster, determining a quantity (e.g., cardinality) of images belonging to each cluster, selecting the cluster with the highest quantity relative to the quantity of other clusters as an inlier cluster, for each image in the first set of images, determining an inlier score for the image that is a measure of similarity of the facial template of the image to the facial templates of the images that belong to the inlier cluster; and re-ranking the images determined to be responsive to a query based on the inlier scores of the set of images. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The template data are not persisted to memory, thus enabling privacy protection for the subjects of the images in a lightweight but very robust manner. The adjustments described in this written description also correct for outlier rankings that may result from rankings based on data external to an image, such as textual tags and user feedback, because the adjustments are based on feature data of the ranked images and not based on data external to the image.

The adjustment of the image search results can be limited to the top N ranked image resources, which enables the generation of facial template data at query time. Alternatively, the adjustments may be limited to popular name queries, such as queries that include names of famous people. In these later cases the adjustments can be pre-processed for queries that consist of a popular name. This reduces resource requirements at query time. The adjustments may be re-processed periodically, e.g., once a day, so that freshness of the results is maintained.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Often people issue queries for images of famous persons. The queries are typically names of the famous persons. In response to these queries, an image search system identifies images, in the form of image search results, that depict the person's face. Frequently, however, there will be outlier images that are identified. The outlier images are often images of other people, and may be the result of a particular search process being sensitive to data such as image tags, which are textual tags associated with the image on web page, or feedback signals, such as selection rates of the image. For example, there may be two famous persons—John Famous and Jane Star—for whom queries are issued often. As a result, many of the images that depict these individuals may have high selection rates. However, Jane Star may have commented on John Famous, and there may be an image of Jane Star with the caption "Jane Star opines on John Famous." A search engine may process this caption and assign the labels [Jane Star] and [John Famous] to the image. Because of the high selection rate, and because of the unambiguous label, the image of Jane Star may surface for searches of John Famous.

The systems and methods described in this application can identify these outlier images for certain queries, and use the outlier identification to adjust the rank of outlier images into lower positions relative to images that depict the subject of the query. Furthermore, particular images that depict the subject of the query may also be boosted in the ranking.

In some implementations, a computer vision based method is used to adjust the rankings of a set of ranked images in response to certain queries, such as celebrity queries. A celebrity query is a query that unambiguously specifies a name and is received by the search engine at a relatively high frequency. For the images that are responsive to these queries, the system detects the faces in the images and builds facial templates. The images are then clustered according to similarity measures of the facial templates. The cluster with the highest quantity is selected, and each image in which a face was detected is compared to each image in the selected cluster. The similarity of each face with the faces in the largest cluster, based on the facial templates, is determined as an inlier score for the image in which the face is depicted. The system then increases the rank of images with high inlier scores and decrease the rank of images with low inlier scores.

These features and additional features are discussed in more detail below.

Figure 1:
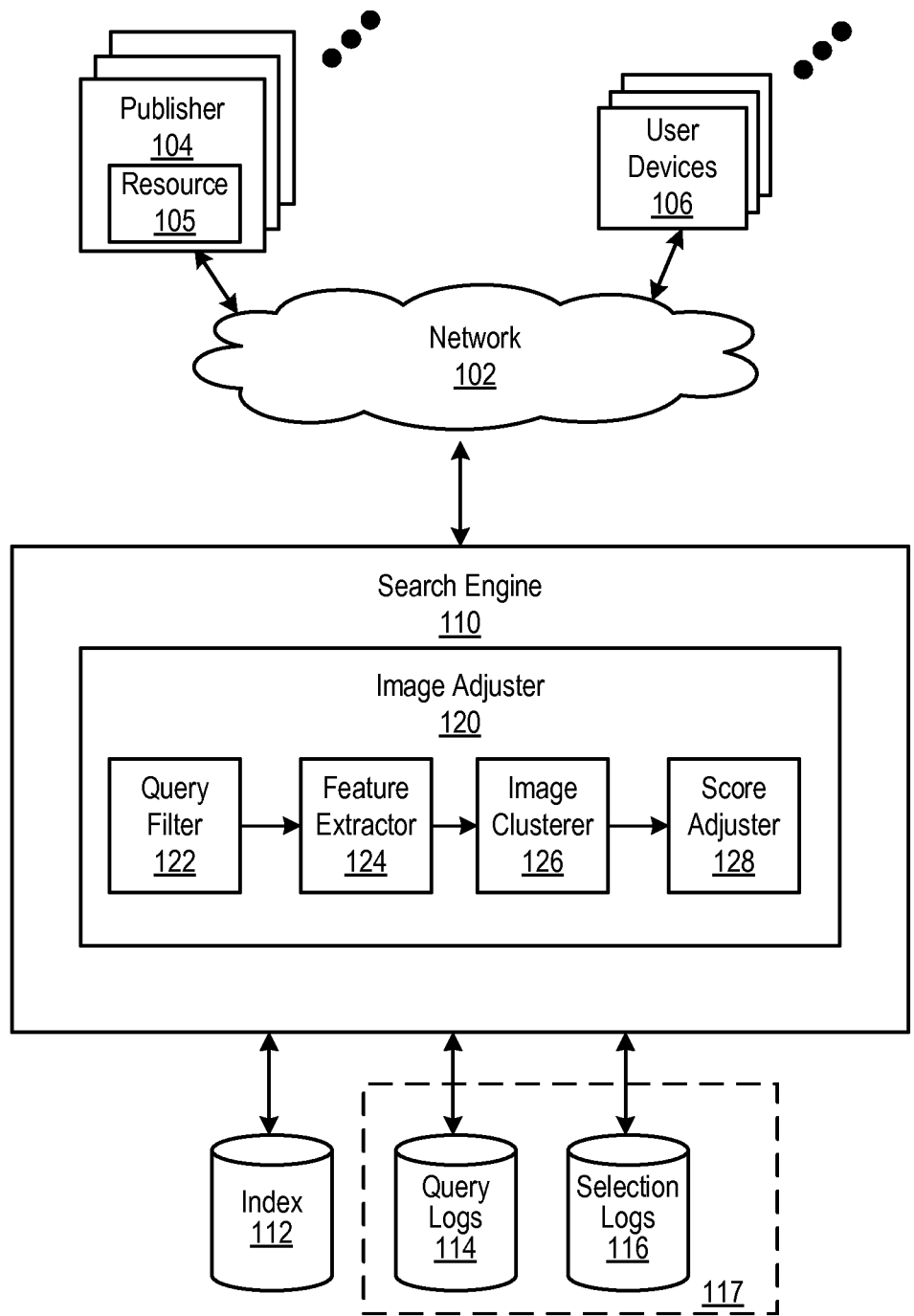
FIG. 1 is a block diagram of an example environment in which image search results are adjusted based on facial features.

FIG. 1 is a block diagram of an example environment 100 in which image search results are adjusted based on facial features. A computer network 102, such as a local area network (LAN), wide area network (WAN), the Internet, or a combination thereof, connects publisher web sites 104, user devices 106, and the search engine 110, and an advertisement management system 120. The online environment 100 may include many thousands of publisher web sites 104 and user devices 106.

A website 104 includes one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a content publisher, which is an entity that controls, manages and/or owns the website 104.

A resource is any data that can be provided by the publisher 104 over the network 102 and that is associated with a resource address. Resources include HTML pages, images, video, and feed sources, to name just a few.

A user device 106 is an electronic device that is under the control of a user and is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102. The web browser can enable a user to display and interact with text, images, videos, music and other information typically located on a web page at a website on the world wide web or a local area network.

To facilitate searching of these resources 105, the search engine 110 identifies the resources by crawling the publisher web sites 104 and indexing the resources provided by the publisher web sites 104. The indexed data are stored in an index 112.

The user devices 106 submit search queries to the search engine. The search queries are submitted in the form of a search request. In response to the search request, the search engine 110 uses the index 112 to identify resources that are relevant to the queries. The search engine 110 identifies the resources in the form of search results and returns the search results to the user devices 106 in search results page resource.

A search result is data generated by the search engine 110 that identifies a resource that satisfies a particular search query, and includes a resource locator for the resource. An example search result can include a web page title, a snippet of text extracted from the web page, and the URL of the web page. In the case of images, the search result includes a representation of an image that is provided on the webpage. The representation may be a thumbnail, which is the image file in a reduced size.

The search results are ranked based on scores related to the resources identified by the search results, such as information retrieval ("IR") scores, feedback signals, and optionally a separate ranking of each resource relative to other resources (e.g., an authority score). The search results are ordered according to these scores and provided to the user device according to the order.

The user devices 106 receive the search results pages and render the pages for presentation to users. In response to the user selecting a search result at a user device 106, the user device 106 requests the resource identified by the resource locator included in the selected search result. The publisher of the web site 104 hosting the resource receives the request for the resource from the user device 106 and provides the resource to the requesting user device 106.

In some implementations, the queries submitted from user devices 106 are stored in query logs 114. Click data for the queries and the web pages referenced by the search results are stored in click logs 116. The query logs 114 and the click logs 116 define search history data 117 that include data from and related to previous search requests. The click logs define actions taken responsive to search results provided by the search engine 110. The query logs 114 and click logs 116 can be used to map queries submitted by the user devices to web pages that were identified in search results and the actions taken by users. The click logs 116 and query logs 114 can thus be used by the search engine to determine the sequence of queries submitted by the user devices, the actions taken in response to the queries, and how often the queries are submitted.

For certain images types, an image adjuster 120 processes the images (or thumbnails thereof) that have been identified as being responsive to a query to detect outliers. The outliers are then demoted in a ranking relative to images that are not outliers. The image adjuster 120 can implement the adjustment process for image sets for which there are distinctive features in the images that result in very high similarities between images, and for which there are a sufficient number of images available to process. One example type of such images is images of famous people for which image search results typically identify images that depict faces of the famous people.

In the example implementation of FIG. 1, the image adjuster includes a query filter 122, a feature extractor 124, and image clusterer 126, and a score adjuster 128. Each component 122, 124, 126 and 128 can be implemented in computer devices that are programmed to carry out the operations described below. Special purpose circuitry can also be used. The architecture shown in FIG. 1 is illustrative, and other types of architectures and functional distributions can also be used. Operation of the image adjuster 120 is described with reference to FIG. 2, which is a system flow diagram 200 describing the adjustment of image search results based on facial features, and FIG. 3, which is a flow diagram of an example process 300 for adjusting image search results based on facial features.

In some implementations, the process 300 is executed for only images determined to be responsive to a name query that specifies a person name and that meets a popularity threshold. For example, the query filter 122 may determine that the process 300 be executed for queries are a person name, e.g., [John Famous], [Jane Star]—and that meet a popularity threshold. The popularity threshold may be for example, a query frequency that measures how often a query is received relative to other queries, or a raw query count, or some other popularity threshold.

Furthermore, while the process 300 can be done at query time, in some implementations the search system 110 executes the process 300 for images that are responsive to the queries that meet the filtering criteria of the query filter 122.

For each query, the inlier scores of the images and the adjusted rankings may then be cached and served in response to receiving one of the queries. The process 300 may be repeated periodically, e.g., once per day, to ensure that the image results are kept current.

The process 300 receives data identifying images determined to be responsive to a query (302). Each image has an associated search score that is a measure of responsiveness to the query. The search scores are generated by another process implemented in the search engine 110. The images ranked according to a first order based on the search scores.

Figure 2:
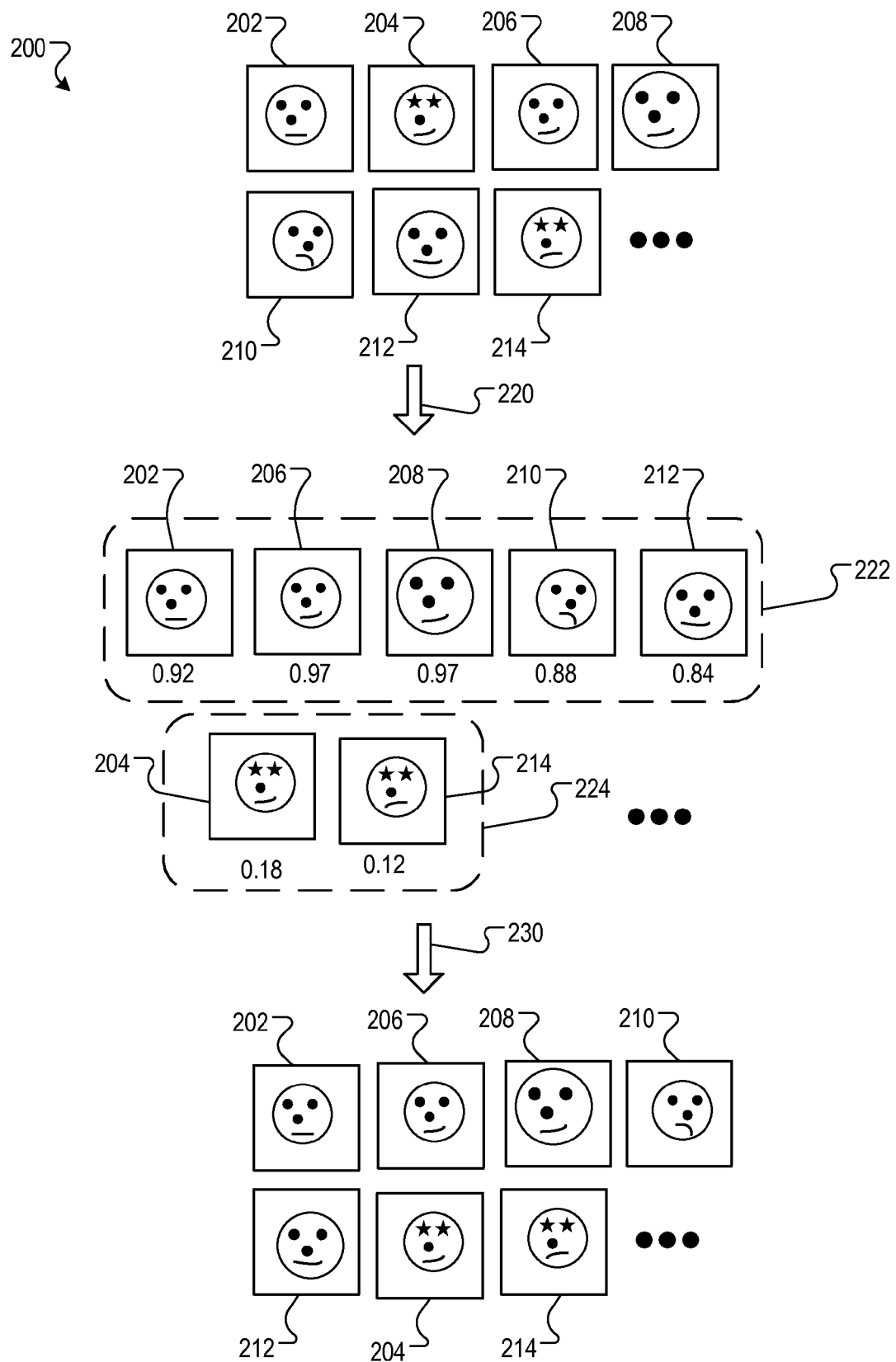
FIG. 2 is a system flow diagram describing the adjustment of image search results based on facial features.
Figure 3:
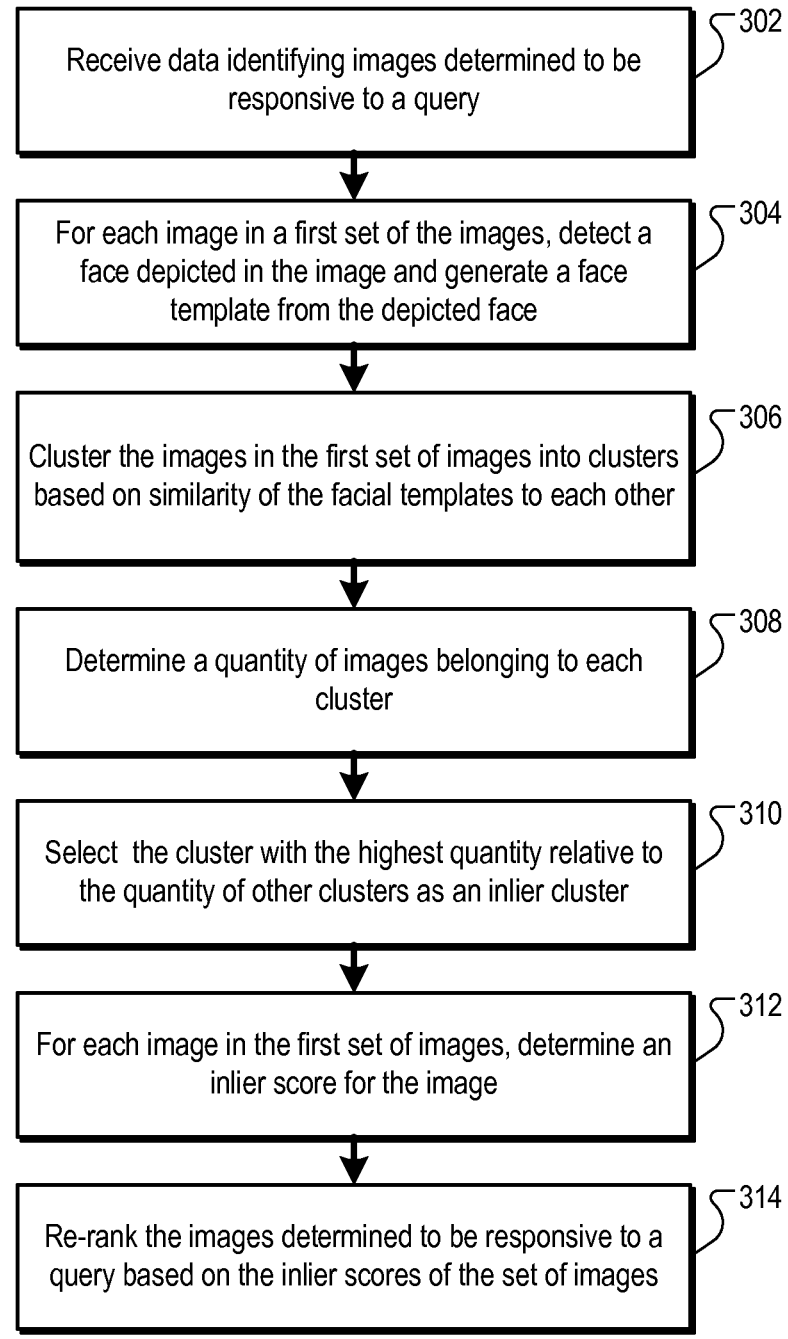
FIG. 3 is a flow diagram of an example process for adjusting image search results based on facial features.

For example, in FIG. 2, the images 202, 204, 206, 208, 210, 212 and 214 are identified as being responsive to the query [John Famous], and are ranked in a first order in which the image 202 is ranked first, 204 is ranked second, and so on. In practice, more images than shown in FIG. 2 are usually identified, as indicated by the ellipses. For example, the search engine may provide scores for at least 1,000 (or more) images. However, for the purposes of describing an example implementation, only seven images are illustrated in FIG. 2.

The process 300, for each image in a first set of the images, detects a face depicted in the image and generates a face template from the depicted face (304). For example, the image adjuster 120 may include a feature extractor 124 to detect facial features and build temporary facial templates from the facial features. A variety of facial recognition and facial template generation processes can be used to detect faces and generate facial templates. For example, each image may be processed to identify "facial landmarks" or other machine-identifiable properties of the structures visible in the face images. Temporary facial recognition templates can be created by processing, for each image, measurements of the relative distance between all of the detected features of the face, e.g., eyes, ears, nose, corners of mouth, cheek bones, and can produce comparative ratios for those distances.

Typically all of the images that are returned for the query will include a face. In such situations, the first set of images is all of the images that are returned in response to the query. However, in some situations, some of the images may not include a face, or the face may not be detectable by a machine process; in these situations, the first set of images is the proper subset of images that excludes the images that do not include a face. The images that are excluded from the first set are not subject to the additional processing described in more detail below.

The process 300 clusters the images in the first set of images into clusters based on similarity of the facial templates to each other (306). For example, the image clusterer 126 may cluster the images into one or more clusters. Each cluster includes at least one of the images, and each image belongs to only one cluster. A variety of processes can be used to determine the similarity of facial templates to each other. Likewise, a variety of clustering algorithms can be used to generate the clusters, including k-means clustering, agglomerative clustering, and so on.

In FIG. 2, the flow element 220 indicates that the images 202, 204, 206, 208, 210, 212 and 214 have been processed for facial templates and clustered. Two resulting clusters are shown—cluster 222 and cluster 224. Cluster 222 includes images 202, 206, 208, 210, and 212, which are each an image of the celebrity John Famous. Cluster 224 includes images 204 and 214, which are each an image of the celebrity Jane Star.

While two clusters are shown for two different persons, multiple clusters can emerge for the same person. For example, there may be several (or more) clusters that each includes images of John Famous. Additionally, while each cluster depicted includes multiple images, a cluster may only include one image if the image is significantly dissimilar from all the other images in the first set of images.

The process 300 determines a quantity of images belonging to each cluster (308). For example, the image clusterer 126 counts the images that belong to each cluster. In FIG. 2, the cluster 222 has a quantity of 5 and the cluster 224 had a quantity of 2.

The process 300 selects the cluster with the highest quantity relative to the quantity of other clusters as an inlier cluster (310). For example, the image clusterer selects the cluster 222 as the inlier cluster. In most situations, the largest cluster produced by the image clusterer 126 is composed of images that depict faces of the subject person, because the vast majority of the images identified in response to the query are images of the subject person. Faces of other people are likely to be collected in much smaller clusters.

In practice, the clusters may include hundreds of images. In the even that two clusters each have a highest quantity (e.g., two clusters each have a quantity of N, with N being greater than all other cardinalities), one of the clusters may be selected at random. In other implementations, underlying quality scores of the images can be processed to determine which cluster has the highest quality, and the cluster that has the highest quality is selected. In still other implementations, the tightness of each cluster may be determined (e.g., the overall similarity of the images belonging to each cluster is determined), and the cluster with the highest tightness is selected. In yet other implementations, the clusters may be merged.

The process 300, for each image in the first set of images, determines an inlier score for the image (312). For example, the score adjuster 128 determines the corresponding inlier scores, which are depicted beneath each image in FIG. 2. The inlier score for each image in the first set is a measure of similarity of the facial template of the image to the facial templates of the images that belong to the inlier cluster. For example, each image in the first set is compared to the images in the inlier cluster to determine the corresponding inlier score for the images.

With reference to FIG. 2, for example, the facial template for the image 202 is compared to the facial templates for the images 206, 208, 210 and 212. The comparison may be processed in the form of a central tendency similarity score of the image to the images of the inlier cluster, such as an average similarity score, or median similarity score. The central tendency similarity score can be determined by calculating a central tendency of the similarity of the facial template for the image 202 to the facial templates for the images 206, 208, 210 and 212. Similarity, for the image 206, its facial template is compared to the facial templates for the images 202, 208, 210 and 212, and so on.

The facial templates of images that belong to other clusters are also compared to the facial templates of the images that belong to the inlier cluster. For example, the facial template for the image 204 is compared to the facial templates of the images 202, 206, 208, 210 and 212 to arrive at the inlier score of 0.18. Likewise, the facial template for the image 214 is compared to the facial templates of the images 202, 206, 208, 210 and 212 to arrive at the inlier score of 0.12.

In some implementations, images that do not belong to any cluster (which is the same as belonging to a cluster having a quantity of 1) are assigned a minimum inlier score. For example, if the inlier score ranges from 0 to 1, then the inlier score for such an image is 0. This is because images that do not belong to any cluster are very likely to be of a person different from the person in depicted in the inlier cluster.

In a variation of this implementation, the images that belongs to a cluster with a quantity less than or equal to a minimum quantity threshold each receive a minimum inlier score for the image. The minimum quantity threshold may be, for example, 3, 5, or some other value that is relatively small when compared to the quantity of the inlier cluster. For example, the minimum quantity may be a predefined fraction of the quantity of the inlier cluster, e.g., 2% of the quantity of the inlier cluster.

In some implementations, duplicate images are accounted for when determining inlier scores. The processing of duplicate images when determining inlier scores is described with reference to FIG. 4 below.

After the inlier scores are determined, the facial templates can be discarded.

The process 300 re-ranks the images determined to be responsive to a query based on the inlier scores of the set of images (314). For example, the score adjuster 128 may implement a variety of processes to adjust search scores of the images based on inlier scores. For example, for images that do not have inlier scores, the search scores are not adjusted. For images that do have inlier scores, i.e., the images in the first set of processed images, images may be boosted when their inlier score is greater than a first threshold inlier score. Likewise, images may be demoted when their inlier score is less than the first threshold inlier score (or less than a second threshold inlier score that is less than the first threshold inlier score.

A variety of linear functions can be used to boost and demote the search scores. For example, an adjustment function may be of the form:

$$IS_j > IST_1: Adj\_Score_j = SS_j*(B*(IS_j - IST_1) + 1);$$

$$IS_j < IST_2: Adj\_Score_j = SS_j*\max((D*(IS_j - IST_2) + 1), SD);$$

$$Else: Adj\_Score_j = SS_j$$

where:
$IS_j$ is the inlier score of the $j^{th}$ image;
$Adj\_Score_j$ is the resulting adjusted search score for the $j^{th}$ image;
$SS_j$ is the original search score of the $j^{th}$ image;
$B$ is a boost factor;
$IST_1$ is the first inlier score threshold;
$D$ is a demote factor;
$IST_2$ is a second inlier score threshold; and
$SD$ is a strong demote factor.

The values of the first inlier score threshold and the second inlier score threshold may be the same, or the second inlier score threshold may be less than the first inlier score threshold.

Once the scores are adjusted, the images are re-ranked according to the new scores. For example, as shown in FIG. 2, the images are re-ranked according to a second order in which the image 204 and 214 have been demoted relative to the images 202, 206, 208, 210 and 212.

The adjustment described above is just one example adjustment process, and a variety of other adjustment processes can be used. For example, other functions can be used to adjust the search scores. Alternatively, images may be demoted or promoted by fixed amounts from their respective ordinal positions based on inlier scores. One example ordinal position adjustment can involve boosting or demoting images according magnitudes of their inlier scores. For example, an inlier score in a first rage that includes a maximum inlier score may result in a first positive boost, an inlier score in a second rage having values that are less than the values in the first range may result in a second positive boost that is less than the first boost, an inlier score in a third rage having values that are less than the values in the second range may result in no boost, an inlier score in a fourth range having values that are less than the values in the third range may result in a first negative boost, and an inlier score in a fifth range having values that are less than the values in the fourth range may result in a second negative boost that is a larger negative boost than the first negative boost, and so on.

Frequently duplicate images are identified in response to a query. An image is a duplicate of another if features of the images result in a similarity score that meets a threshold. For example, with respect to facial features, the same image may be provided by different publishers, or cropped version of the image may be provided.

In some implementations, these images, when compared based on their facial templates, will be determined to be duplicates and are grouped as a set of duplicate images. In some implementations, only one duplicate image from a set of two or more duplicate images is processed to determine inlier scores. The one image selected is used to compare to all other images to determine its respective inlier score, which is then propagated to all other duplicate images in its group. For example, assume the images 206 and 208 are duplicate images, i.e., the image 208 is a cropped version of the image 206. Because they are duplicates, only one of the images is processed to determine an inlier score (0.97), and the inlier score is applied to both images in the group.

Likewise, when other images are processed to determine their respective inlier scores, each other image is only compared to one image from the set of duplicate images. For example, in this implementation, the image 202 is only compared to images 206, 210 and 212 to determine its inlier score; the comparison to image 208 is skipped, as that image and image 206 are duplicates.

The quantity of a cluster may also be affected by duplicates. In some implementations, for example, duplicate images only contribute to one count towards the quantity of a cluster. For example, with reference to FIG. 2, the quantity of the cluster 222 may be 4, as two of the images—206 and 208—are duplicates.

Figure 4:
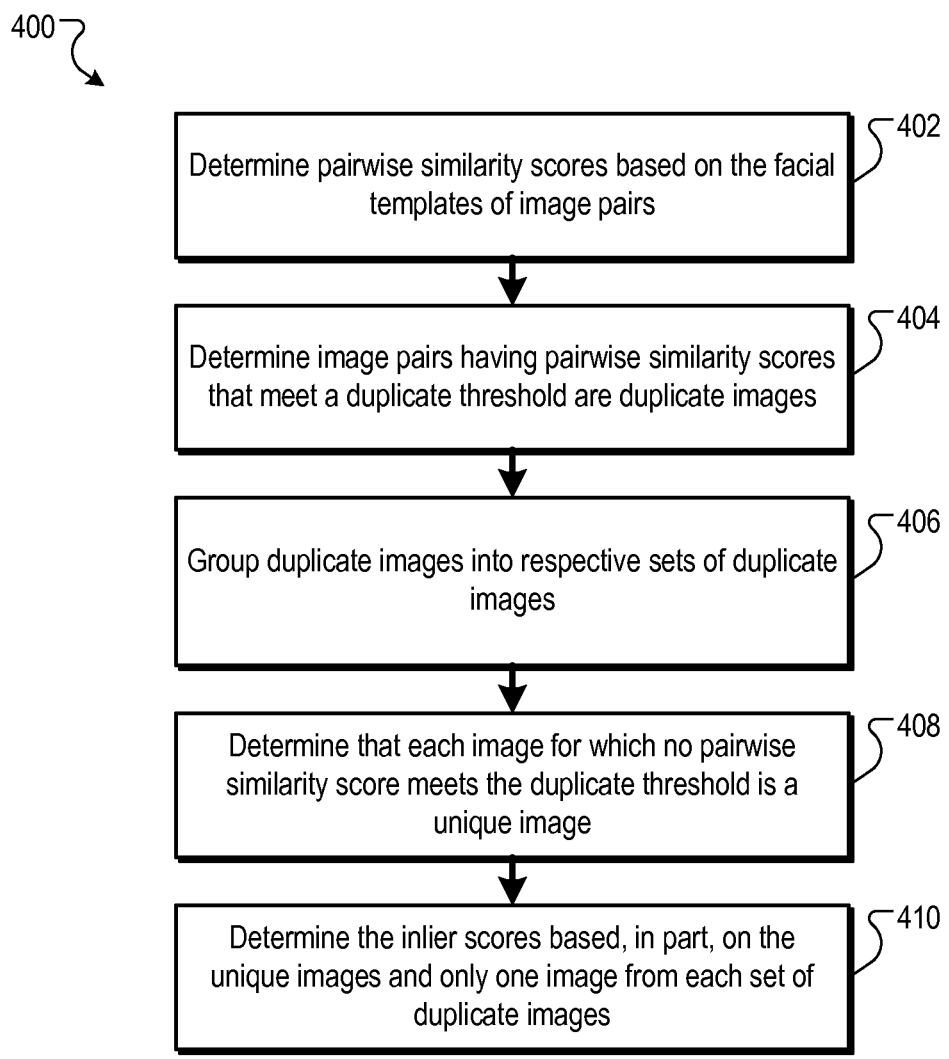
FIG. 4 is a flow diagram of an example process for handling duplicate images for inlier score determination.

The handling of duplicate images is described in more detail with reference to FIG. 4, which is a flow diagram of an example process 400 for handling duplicate images for inlier score determination.

The process 400 determines pairwise similarity scores based on the facial templates of image pairs (402). For example, the score adjuster 128, for each image, determines a pairwise similarity to each other image, e.g., for the image 202, pairwise similarities are determined for images pairs of (202, 204), (202, 206), (202, 208), (202, 210), (202, 212), and (202, 214), and so on. Likewise, for the image 206, pairwise similarities are determined for images pairs of (206, 208), (206, 210), and so on.

The process 400 determines image pairs having pairwise similarity scores that meet a duplicate threshold are duplicate images (404). For example, the score adjuster 128 determines that the images 206 and 208 have a similarity score that meets a duplicate threshold. None of the other image pairs, however, have a similarity score that meets the duplicate threshold.

The process 400 groups duplicate images into respective sets of duplicate images (406). For example, the score adjuster 128 groups images 206 and 208 into a set of duplicate images. From this set, one image may be selected when determining inlier scores.

The process 400 determines that each image for which no pairwise similarity score meets the duplicate threshold is a unique image (408). For example, the score adjuster 128 determines images 202, 204, 210, 212, and 214 are unique images.

The process 400 determines the inlier scores based on the unique images and only one image from each set of duplicate images (410). For example, as described above, only one duplicate image from the set of images 206 and 208 is selected to determine inlier scores. For example, image 208 is selected and used to compare to all other images to determine its respective inlier score, which is then propagated to image 204. Likewise, when other images are processed to determine their respective inlier scores, each other image is only compared to image 208, and image 206 is skipped.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of what may be claimed, but rather as descriptions of features specific to particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   receiving, by the data processing apparatus, data identifying images determined to be responsive to a query, each image having an associated search score that is a measure of responsiveness to the query, and the images ranked according to a first order based on the search scores, and in response to receiving the data identifying the images:
   for each image in a first set of the images, detecting, by the data processing apparatus, a face depicted in the image and generating a face template from the depicted face by processing the image using a facial template generation process that identifies machine-identifiable properties of structures of a face, and where each face template is a temporary face template that is not persisted to memory;
   clustering, by the data processing apparatus, the images in the first set of images into a plurality of clusters based on similarity of the facial templates to each other, each cluster including at least one of the images, and each image belonging to only one cluster;
   determining, by the data processing apparatus, a quantity of images belonging to each cluster;
   selecting, by the data processing apparatus, the cluster with the highest quantity relative to the quantity of other clusters as an inlier cluster;
   for each image in the first set of images, determining, by the data processing apparatus, an inlier score for the image that is a measure of similarity of the facial template of the image to the facial templates of the images that belong to the inlier cluster; and
   re-ranking, by the data processing apparatus, the images determined to be responsive to a query based on the inlier scores of the set of images;
   wherein the determining the inlier score comprises, for images that belong to the inlier cluster that are determined to be duplicate images of each other, using only one of the images from the images determined to be duplicate images of each other to determine the inlier score.

2. The method of claim 1, where the first set of images is a proper subset of the images determined to be responsive to a query.

3. The method of claim 1, wherein re-ranking the images determined to be responsive to a query based on the inlier scores of the set of images comprises increasing the rank of images with high inlier scores relative to images with low inlier scores.

4. The method of claim 1, wherein re-ranking the images determined to be responsive to a query based on the inlier scores of the set of images comprises:
   adjusting the search score of each image in the set of images by its respective inlier score; and
   re-ranking the images determined to be responsive to the query based, in part, on the adjusted search scores of the images determined to be responsive to the query.

5. The method of claim 1, wherein:
   clustering the images comprises:
   determining pairwise similarity scores based on the facial templates of image pairs;
   determining that image pairs having pairwise similarity scores that meet a duplicate threshold are duplicate images and grouping duplicate images into respective sets of duplicate images; and
   determining that each image for which no pairwise similarity score meets the duplicate threshold is a unique image.

6. The method of claim 5, wherein determining the inlier score comprises determining the inlier scores based on the unique images and only one image from each set of duplicate images.

7. The method of claim 1, wherein determining the inlier score comprises determining, for each image that belongs to a cluster with a quantity less than or equal to a minimum quantity threshold, a minimum inlier score for the image.

8. The method of claim 7, wherein the minimum quantity threshold is 1.

9. The method of claim 1, wherein determining an inlier score for the image comprises determining a central tendency similarity measure of the facial template of the image to the facial templates of the images that belong to the inlier cluster.

10. The method of claim 1, wherein receiving data identifying images determined to be responsive to a query comprises receiving only data identifying images determined to be responsive to a name query that specifies a person name and that meets a popularity threshold.

11. A computer storage medium encoded instructions that when executed by a data processing apparatus cause the data processing apparatus to perform operations comprising:
  receiving data identifying images determined to be responsive to a query, each image having an associated search score that is a measure of responsiveness to the query, and the images ranked according to a first order based on the search scores, and in response to receiving the data identifying the images:
  for each image in a first set of the images, detecting a face depicted in the image and generating a face template from the depicted face by processing the image using a facial template generation process that identifies machine-identifiable properties of structures of a face, and where each face template is a temporary face template that is not persisted to memory;
  clustering the images in the first set of images into a plurality of clusters based on similarity of the facial templates to each other, each cluster including at least one of the images, and each image belonging to only one cluster;
  determining a quantity of images belonging to each cluster;
  selecting the cluster with the highest quantity relative to the quantity of other clusters as an inlier cluster;
  for each image in the first set of images, determining an inlier score for the image that is a measure of similarity of the facial template of the image to the facial templates of the images that belong to the inlier cluster; and
  re-ranking the images determined to be responsive to a query based on the inlier scores of the set of images;
  wherein the operation determining the inlier score comprises, for images that belong to the inlier cluster that are determined to be duplicate images of each other, using only one of the images from the images determined to be duplicate images of each other to determine the inlier score.

12. A system comprising: a data processing apparatus; and computer storage medium encoded instructions that when executed by a data processing apparatus cause the data processing apparatus to perform operations comprising:
  receiving data identifying images determined to be responsive to a query, each image having an associated search score that is a measure of responsiveness to the query, and the images ranked according to a first order based on the search scores, and in response to receiving the data identifying the images:
  for each image in a first set of the images, detecting a face depicted in the image and generating a face template from the depicted face by processing the image using a facial template generation process that identifies machine-identifiable properties of structures of a face, and where each face template is a temporary face template that is not persisted to memory;
  clustering the images in the first set of images into a plurality of clusters based on similarity of the facial templates to each other, each cluster including at least one of the images, and each image belonging to only one cluster;
  determining a quantity of images belonging to each cluster;
  selecting the cluster with the highest quantity relative to the quantity of other clusters as an inlier cluster;
  for each image in the first set of images, determining an inlier score for the image that is a measure of similarity of the facial template of the image to the facial templates of the images that belong to the inlier cluster; and
  re-ranking the images determined to be responsive to a query based on the inlier scores of the set of images;
  wherein determining the inlier score comprises, for images that belong to the inlier cluster that are determined to be duplicate images of each other, using only one of the images from the images determined to be duplicate images of each other to determine the inlier score.

13. The system of claim 12, where the first set of images is a proper subset of the images determined to be responsive to a query.

14. The system of claim 12, wherein re-ranking the images determined to be responsive to a query based on the inlier scores of the set of images comprises increasing the rank of images with high inlier scores relative to images with low inlier scores.

15. The system of claim 12, wherein re-ranking the images determined to be responsive to a query based on the inlier scores of the set of images comprises:
  adjusting the search score of each image in the set of images by its respective inlier score; and
  re-ranking the images determined to be responsive to the query based, in part, on the adjusted search scores of the images determined to be responsive to the query.

16. The system of claim 12, wherein:
  clustering the images comprises:
    determining pairwise similarity scores based on the facial templates of image pairs;
    determining that image pairs having pairwise similarity scores that meet a duplicate threshold are duplicate images and grouping duplicate images into respective sets of duplicate images; and
    determining that each image for which no pairwise similarity score meets the duplicate threshold is a unique image.

17. The system of claim 16, wherein determining the inlier score comprises determining the inlier scores based on the unique images and only one image from each set of duplicate images.

18. The system of claim 12, wherein determining the inlier score comprises determining, for each image that belongs to a cluster with a quantity less than or equal to a minimum quantity threshold, a minimum inlier score for the image.

19. The system of claim 12, wherein determining an inlier score for the image comprises determining a central tendency similarity measure of the facial template of the image to the facial templates of the images that belong to the inlier cluster.

20. The system of claim 12, wherein receiving data identifying images determined to be responsive to a query comprises receiving only data identifying images determined to be responsive to a name query that specifies a person name and that meets a popularity threshold.

* * * * *